March 10, 1925.
H. C. TUCKER
ELECTRICAL CONTROL INSTRUMENT
Filed Oct. 5, 1922
1,529,096
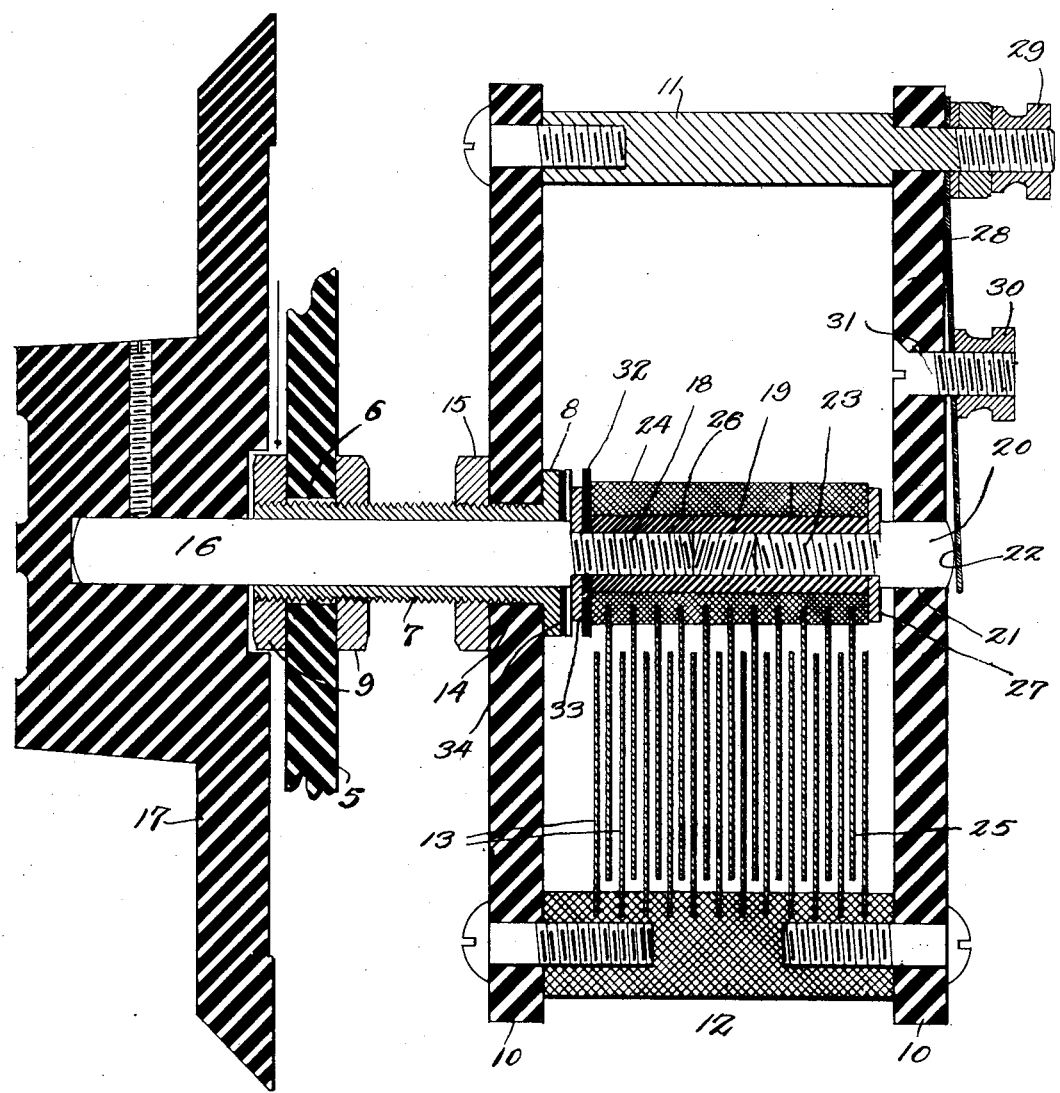
Witnesses
Cecil H Wilson
B. Randall
Hurd C Tucker
Inventor Patented Mar. 10, 1925.

1,529,096

UNITED STATES PATENT OFFICE.

HURD C. TUCKER, OF SUMTER, SOUTH CAROLINA.

ELECTRICAL CONTROL INSTRUMENT.

Application filed October 5, 1922. Serial No. 592,611.

*To all whom it may concern:*

Be it known that I, HURD C. TUCKER, a citizen of the United States, residing at Sumter, in the county of Sumter and State of South Carolina, have invented certain new and useful Improvements in Electrical Control Instruments, of which the following is a specification.

My invention relates to improvements in variable condensers.

Important objects of the invention are to provide a simple and rigid method of mounting a condenser upon the front panel of a wireless set; to provide a method of bushing which will practically eliminate imperfect action of the condenser through service wear; to insulate the front axle or shaft from the electrical circuits of the condenser so as to eliminate possible capacity effect from the hand in regulating the condenser; and to provide a simple and convenient method of adjusting the tension of a contact or spring upon the rear end of the axle or rear axle.

Other objects and advantages of the invention will be apparent during the course of the following description.

In the accompanying drawings forming a part of this specification, and in which like numerals are employed to designate like parts throughout the same, The figure is a central vertical transverse section through a condenser embodying my invention.

In the drawings, wherein for the purpose of illustration is shown a preferred embodiment of my invention, the numeral 5 designates the stationary front panel of a wireless set, constituting the support for the various elements of the condenser. This panel is provided with an opening 6, for receiving a tube or sleeve 7, preferably formed of brass or the like. This tube is exteriorly screw threaded, preferably throughout substantially its entire length, and is preferably provided at its rear end with a head 8, although a nut may be screwed upon this rear end, for use in place of this head. The sleeve 7 is passed through the opening 6 in the panel and is clamped thereto by nuts 9, carried thereby.

The base of the condenser embodies a pair of insulating members or panels 10, which may be connected at their upper ends by a bolt or binding post 11. The lower end of these plates or panels is connected by a metallic support 12, carrying the stationary condenser plates 13.

The base of the condenser is mounted upon the sleeve 7, and to this end, one plate or panel 10 is provided with an opening 14, for passage of the sleeve 7, the head 8 engaging upon the rear side of the adjacent panel 10, within the assembled condenser. A coacting clamping nut 15 is carried by the sleeve 7, and serves to clamp the panel 10 rigidly against the head 8.

Fitting snugly within the sleeve 7 is a rotatable adjusting shaft 16, preferably formed of brass, the sleeve 7 and shaft being of course circular in cross section. This shaft has a knob or dial 17, clamped upon its forward end, for turning it. The adjusting shaft 16 preferably extends rearwardly past the head 8, for a short distance, and carries the reduced screw threaded extension 18, which is screw threaded into an insulating sleeve or bushing 19. This engagement is preferably a tight fit, so that the sleeve or bushing 19 will rotate with the reduced extension 18. It is preferred to provide a rear shaft 20, rotatable within an opening 21, formed in the rear panel, and preferably having its end 22 rounded, and projecting outwardly beyond this rear panel. The shaft 20 carries a reduced screw threaded portion 23, which is screw threaded into the insulating bushing or sleeve 19, preferably having a tight fit therein so that the bushing will turn with it. The numeral 24 designates the rotor hub, formed of any suitable metal, and carrying the adjustable plates 25. The hub 24 is tubular for providing an opening 26, extending throughout its entire length, for the reception of the insulating bushing 19. There is preferably a tight fit between these parts, so that the hub and the insulating bushing turn as a unit, although other means might be employed to lock these parts together. One side of the circuit is electrically connected with the adjustable plates 25, by means of a washer 27, preferably formed of brass. This washer is mounted upon the reduced screw threaded extension 23 of the shaft 20, and is clamped between the shoulder of the shaft 20 and the hub 24. The circuit is completed through the shaft 20, through a spring contact 28, which engages the rounded end 22. The spring contact leads to a binding post 29. The tension of the spring 28 is regulated by means of an adjustable nut 30, carried by a screw 31, mounted upon the panel 10 and passing through an opening in the spring 28. By adjusting the nut 30 the tension of the spring 28 upon the shaft 20 will be regulated, and this will regulate the freedom of turning movement of the hub. This is an important feature of the invention, as it assures the accurate adjustment of the rotor, when the parts wear slightly. Of course the stationary plates 13 are electrically connected with the other side of the circuit.

An important feature of the invention is the complete insulation of the adjusting shaft 16, from the rotor circuit. This is accomplished by having the screw threaded extension 18 project into the insulating sleeve 19, preferably formed of hard rubber. The reduced extension 18 carries an insulating washer 32, formed of mica or the like. I prefer to employ a brass washer 33 between the shoulder of the shaft 16 and the insulating washer 32, and I may also place an insulating washer 34, formed of fibre, between the washer 33 and the head 8. These washers 33 and 34 serve as spacing washers between the insulating washer 32 and the head 8. It will be seen that I have effected a very strong and durable connection between the adjusting shafts 16 and the rotor, and thoroughly insulated this shaft from the rotor circuit or circuits.

In view of the foregoing description it is thought that the construction and operation of the device has been made clear.

It is to be understood that the form of my invention herewith shown and described, is to be taken as a preferred example of the same, and that various changes in the shape, size, and arrangement of parts, may be resorted to, without departing from the spirit of my invention, or the scope of the subjoined claims.

Having thus described my invention, I claim:

1. A supporting panel, a metallic sleeve mounted thereon, a condenser insulating panel carried by the sleeve, an adjusting shaft rotatable within the sleeve and having a screw threaded extension, an insulating bushing mounted upon the screw threaded extension, a metallic hub mounted upon the bushing, an insulating washer between the metallic hub and adjusting shaft, a set of plates carried by the hub, and a second set of plates carried by the condenser panel.

2. A supporting panel, a metallic sleeve clamped thereon, a condenser insulating panel clamped upon the metallic sleeve, a second condenser insulating panel having an opening and spaced from the first named condenser insulating panel and connected therewith, an adjusting shaft rotatable within the sleeve and having a screw threaded extension, a rear shaft rotatable within the opening of the second condenser insulating panel and having a screw threaded extension, an insulating bushing receiving the screw threaded extensions therein, a metallic hub mounted upon the insulating bushing, an insulating washer between the end of the metallic hub and the shoulder of the adjusting shaft, a set of plates carried by the hub, a coacting set of plates mounted between the condenser insulating plates, and an adjustable contact element engaging the end of the rear shaft.

3. A support, a metallic sleeve mounted thereon, an insulating support mounted upon the metallic sleeve, a shaft rotatable within the sleeve and projecting beyond the same, an insulating bushing receiving one end of the shaft therein, a metallic hub receiving the insulating bushing, a set of plates carried by the metallic hub, a coacting set of plates carried by the insulating support, and circuit forming means having electrical connection with the hub.

4. A support, a metallic sleeve mounted thereon, an insulating support mounted upon the metallic sleeve, a shaft rotatable within the sleeve and projecting beyond the same, an insulating bushing receiving one end of the shaft therein, a metallic hub receiving the insulating bushing, a metallic element in mechanical and electrical connection with the metallic hub, a spring engaging the metallic element, adjustable means to regulate the tension of the spring, a set of plates carried by the metallic hub, and a coacting set of plates carried by the insulating support.

5. A support, a sleeve mounted thereon, a metallic shaft rotatable within the sleeve and having a reduced extension providing a shoulder, an insulating bushing receiving the reduced extension, a metallic hub upon the bushing, an insulating washer between the end of the hub and the shoulder of the shaft, a set of plates carried by the hub, and a coacting set of plates carried by the insulating support.

6. A support, a sleeve mounted thereon, a metallic shaft rotatable within the sleeve and extending therebeyond, an insulating support mounted upon the sleeve, an insulating bushing receiving a portion of the shaft therein, a metallic hub mounted upon the bushing, a set of plates mounted upon the hub, and a coacting set of plates mounted upon the insulating support.

7. A support, a sleeve mounted thereon, a metallic shaft mounted within the sleeve, an insulating support mounted upon the sleeve, an insulating bushing receiving one end of the shaft therein, a metallic hub mounted upon the insulating bushing, plates mounted upon the hub, coacting plates mounted upon the insulating support, and adjustable friction means connected with the hub for regulating its ease of turning movement.

In testimony whereof I affix my signature.

HURD C. TUCKER.